US005307059A

United States Patent [19]

Connary et al.

[11] Patent Number: 5,307,059

[45] Date of Patent: Apr. 26, 1994

[54] SELECTIVE CALL RECEIVER HAVING CUSTOMIZED VOICE ALERTS

[75] Inventors: Gregg M. Connary; Tom Nolan, both of Boynton Beach, Fla.

[73] Assignee: Motorola, Inc., Schaumburg, Ill.

[21] Appl. No.: 686,850

[22] Filed: Apr. 18, 1991

Related U.S. Application Data

[63] Continuation of Ser. No. 499,223, Mar. 26, 1990, abandoned.

[51] Int. Cl.[5] .......................... G08B 5/22; H04Q 7/00

[52] U.S. Cl. .................................. 340/825.44; 379/71

[58] Field of Search ...................... 340/825.44, 825.46, 340/825.48, 311.1; 379/63, 71; 455/200

[56] References Cited

U.S. PATENT DOCUMENTS

| | | | |
|---|---|---|---|
| 4,330,780 | 5/1982 | Masaki | 340/825.44 |
| 4,419,668 | 12/1983 | Ganucheau, Jr. | 340/825.48 |
| 4,479,124 | 10/1984 | Rodriquez et al. | 340/825.44 |
| 4,480,253 | 10/1984 | Anderson | 340/825.44 |
| 4,536,739 | 8/1985 | Nobuta | 340/825.44 |
| 4,563,680 | 1/1986 | Nakajima | 340/825.44 |
| 4,818,987 | 4/1989 | Ide et al. | 340/825.44 |
| 4,868,561 | 9/1989 | Davis | 340/825.48 |
| 4,873,520 | 10/1989 | Fisch et al. | 340/311.1 |
| 4,962,545 | 10/1990 | Klaczak et al. | 340/825.44 |

*Primary Examiner*—Donald J. Yusko
*Assistant Examiner*—J. Giust
*Attorney, Agent, or Firm*—Michael J. DeLuca; Thomas G. Berry; Pablo Meles

[57] ABSTRACT

A selective call receiver comprises a receiver for receiving a signal, a processor for processing the received signal to detect an address code therein, a storage device for storing information representing at least one personalized alert signal, and a controller coupled to the storage device for presenting one of the personalized alert signals when an appropriate address code is detected.

2 Claims, 3 Drawing Sheets

SELECTIVE CALL RECEIVER HAVING CUSTOMIZED VOICE ALERTS

This application is a continuation of application Ser. No. 07/499,223, filed Mar. 26, 1990, now abandoned.

FIELD OF THE INVENTION

This invention relates in general to selective call receivers, and more specifically, to selective call receivers having one or more personalized alert signals.

BACKGROUND OF THE INVENTION

Selective call radio receivers such as pagers alert a user of a received signal that includes an address identifying that particular selective call receiver. Such devices generally incorporate a radio receiver capable of producing, for example, an audible alert which may be heard by the user. Some pagers provide the additional features of a voice message or a message visually displayed on a screen.

Each selective call receiver is identified by a specific address that typically precedes each message. When a selective call receiver receives a message preceded by that selective call receiver's address, the message is stored within a memory for subsequent presentation.

These selective call receivers are widely used by professional and other individuals in many communities. The use of such selective call receivers has become so proliferated that it has become difficult for an individual in a group, all of which are using pagers, to distinguish his or her signal from the others in the group. Accordingly, some selective call receiver users resort to checking to see if they have received a signal when someone else in the group has received a signal. More disturbingly, however, other selective call receiver users are becoming ambivalent to response tones due to the great frequency that alert tones sound in a group of individuals. This may delay response time in some situations, since the selective call receiver user may not respond to a message intended for him or her, or it may lead to catastrophic damage or loss of life in some situations such as fires, etc. Accordingly, there exists a need in the art for a selective call receiver for providing a distinctive alert tone to the alert user.

SUMMARY OF THE INVENTION

In carrying out the above and other objects of the invention in one form, there is provided a selective call receiver comprising a receiver for receiving a signal, a processor for processing the received signal to detect an address code therein, a storage device for storing at least one personalized alert signal, and a controller coupled to the storage means for presenting one of the personalized alert signals when an appropriate address code is detected.

DETAILED DESCRIPTION OF THE INVENTION

Figure 1:
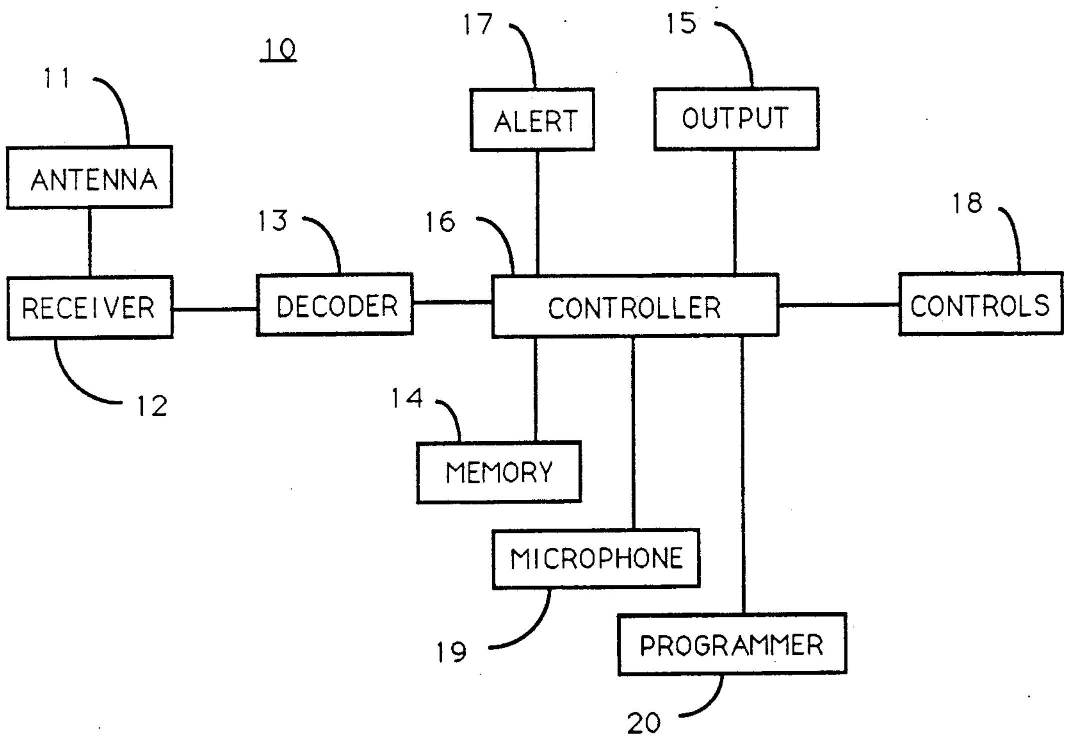
FIG. 1 is a block diagram of the preferred embodiment of the present invention.

Referring to FIG. 1, a selective call radio receiver 10, e.g., a pager, comprises an antenna 11 that provides an RF carrier signal that is mixed with a local oscillator signal and an injection signal in the receiver module 12 for generating a lower frequency IF signal suitable for processing by the decoder 13 in a manner well known to one skilled in the art. The decoder 13 converts the IF signal to the address, optional message data from some selective call receivers, and if the selective call receiver includes an optional voice output, the recovered audio components of the original signal received by the antenna 11. For the message or voice selective call receivers, the recovered message or voice output may be stored in the memory 14 for subsequent "playback" by an output module 15. The controller 16, such as a microprocessor, compares the decoded results with predetermined addresses contained in the memory 14, and when substantially similar, alerts the user by alert mechanism 17 that a signal has been received. The optional output module 15 will automatically, or when manually selected by controls 18, present the message.

For a more detailed description of the structure and operation of a selective call radio paging receiver of the type shown in FIG. 1, reference is made to U.S. Pat. No. 4,518,961; U.S. Pat. No. 4,649,538; and U.S. Pat. No. 4,755,816, issued Jul. 5, 1988; the teachings of which are hereby incorporated by reference.

In accordance with the present invention, a microphone 19 and a programmer 20 provide for the entry of a customized alert signal. The user of the selective call receiver 10, by use of the controls 18, may enter into the memory from the microphone 19 one or more audio sounds such as a voice or tone combination. Each of these audio sounds comprise a customized alert signal which may be recalled from the memory 14 by the controller 16 when a signal is received by the antenna that contains an address identifying the users particular selective call receiver. The programmer 20 may be used to enter into the memory 14 any number of digitized codes representing an alert signal. The programmer 20 may be an element of the selective call receiver 10 or it may comprise an interface for receiving the digitized information from another computer coupled thereto.

Figure 2:
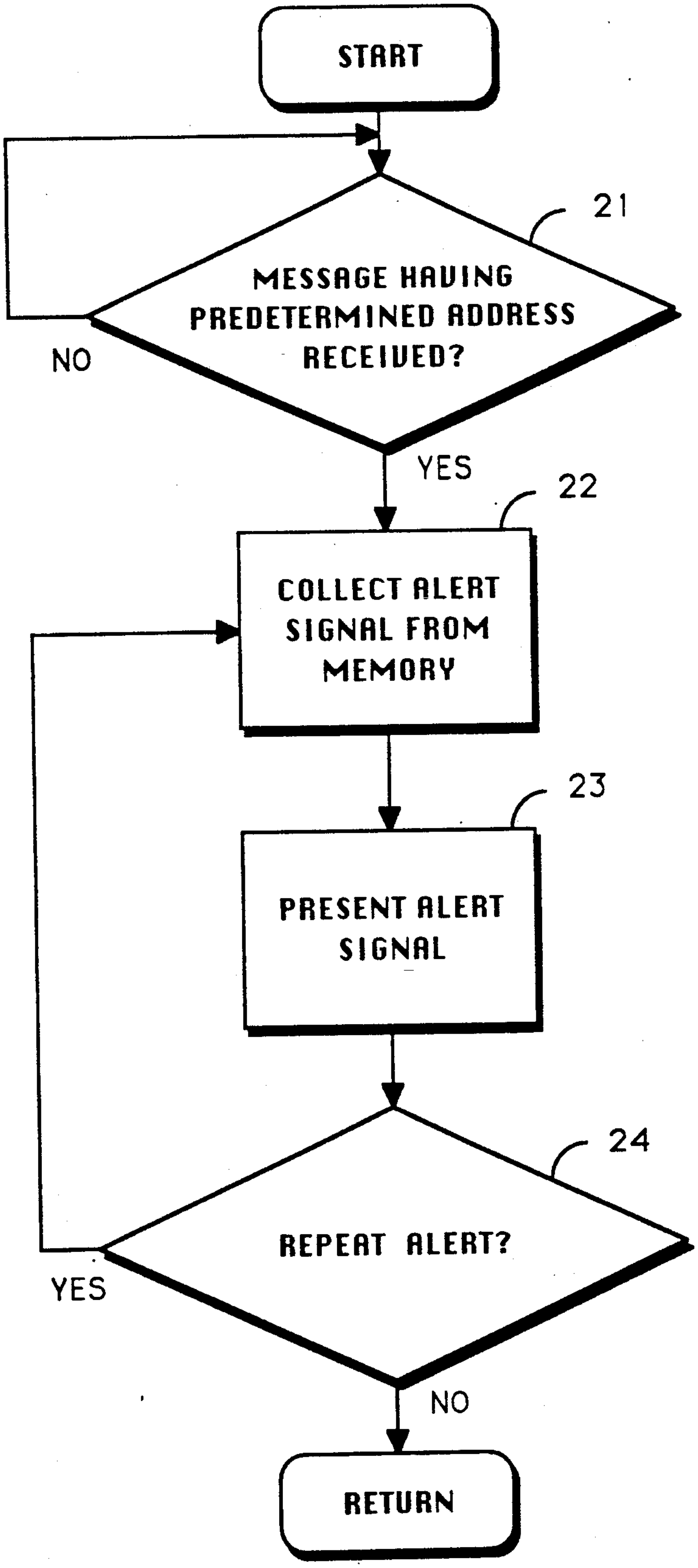
FIG. 2 is a flow diagram illustrating the preferred operation of the preferred embodiment.

Referring to FIG. 2, when a signal is received 21 having a predetermined address identifying the particular selective call receiver 10, the customized alert signal is retrieved 22 from the memory 14. The retrieved alert signal is presented 23, and may be repeated at periodic intervals 24 until a predetermined event occurs, such as a predetermined number of repeats or a user entered signal is received from the control 18. Furthermore, the alert signal may comprise two or more identical portions that are repeated, thereby minimizing the memory space required.

Figure 3:
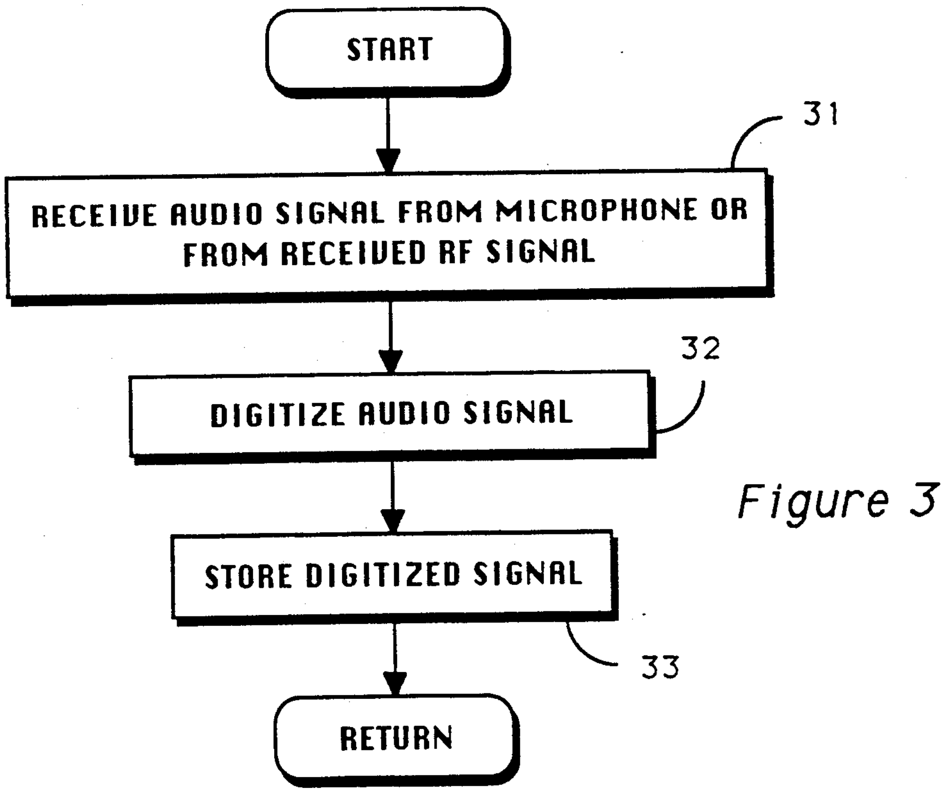
FIG. 3 is a flow diagram of a first embodiment for storing the alert information in the memory of FIG. 1.

Referring to FIG. 3, an audio signal received 31 from either the optional microphone 19 or from the RF signal received over the antenna 11 is digitized 32 and stored 33 in the memory 14. Thereby, the user may enter the customized alert as a duplication of the sound stored from the microphone 19 or the received signal.

Figure 4:
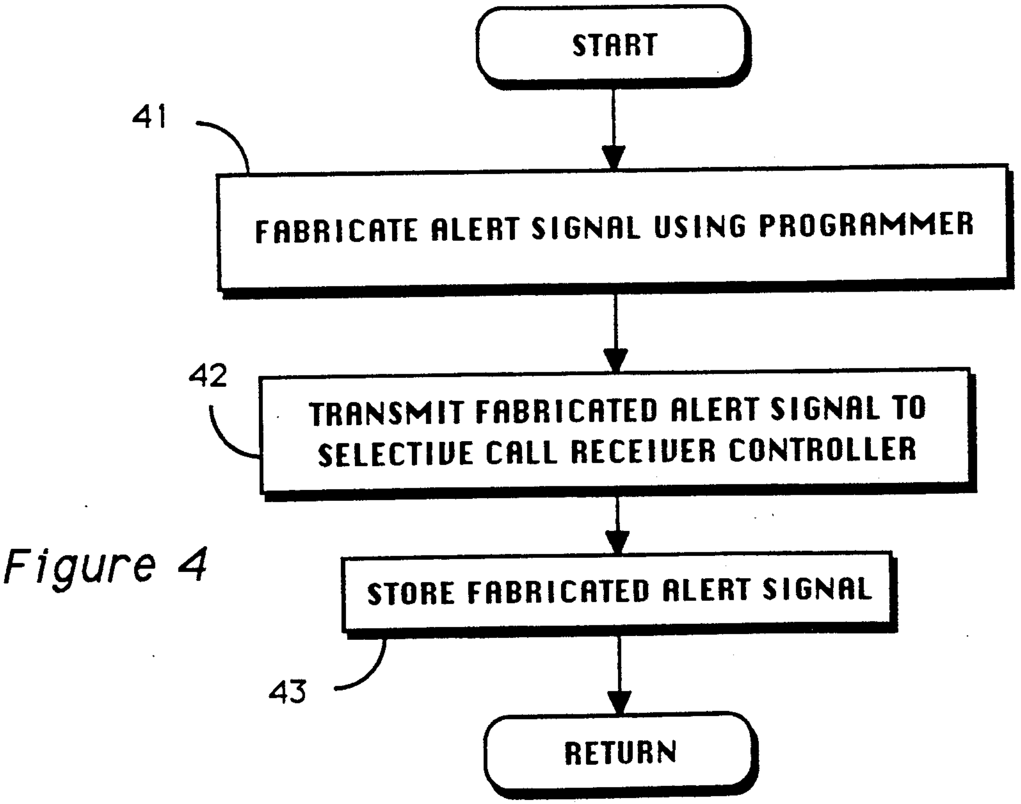
FIG. 4 is a flow diagram of a second embodiment for storing the alert information in the memory of FIG. 1.

Referring to FIG. 4, the alert signal fabricated 41 using the optional programmer 20 is transmitted 42 to the controller 16 and is stored 43 in the memory 14. Thereby, the user may enter the customized alert as a digitized signal from the programmer 20.

In summary, a user of the selective call receiver 10 may create specialized custom alerts for the selective call receiver 10 or for each address of a selective call receiver 10 having two or more addresses. This would allow, on a tone only selective call receiver 10 for example, the user to specify a customized alert for a specific alert address which would have a specific meaning to the user. The customized alert may, for example, be a "yelp", a "siren", one or more spoken words, or a series of different tones.

We claim:

1. A selective call receiver capable of generating at least one user-created voice alert, comprising:

receiver means for receiving a signal;

processing means for processing the received signal to detect an address code and a message therein;

microphone means for receiving the at least one user-created voice alert;

storage means for storing the at least one user-created voice alert prior to receiving the signal; and control means coupled to the storage means for presenting the at least one user-created voice alerts when the address code is detected.

2. In a selective call receiver, a method for alerting a user with a user-defined alert of a received message, comprising the steps of:

customizing the user-defined alert by receiving a phonic signal as created by the user;

receiving the user-defined alert;

digitizing the received user-defined alert;

storing the digitized user-defined alert within a memory;

decoding a received signal to recover an address code and the message therein;

generating the digitized user-defined alert in response to the decoded received signal and from the stored user-defined alert;

presenting the message corresponding to the generated digitized user-defined alert.

* * * * *